(12) United States Patent
Hiejima et al.

(10) Patent No.: US 9,347,332 B2
(45) Date of Patent: May 24, 2016

(54) DYNAMO WITH COLUMNAR OSCILLATOR

(75) Inventors: Shinji Hiejima, Okayama (JP); Kenichi Hayashi, Tamano (JP)

(73) Assignee: MITSUI ENGINEERING & SHIPBUILDING, Tokyo (JP)

( * ) Notice: Subject to any disclaimer, the term of this patent is extended or adjusted under 35 U.S.C. 154(b) by 122 days.

(21) Appl. No.: 14/233,555

(22) PCT Filed: Jun. 20, 2012

(86) PCT No.: PCT/JP2012/004000
§ 371 (c)(1),
(2), (4) Date: Jan. 17, 2014

(87) PCT Pub. No.: WO2013/014854
PCT Pub. Date: Jan. 31, 2013

(65) Prior Publication Data
US 2014/0167418 A1    Jun. 19, 2014

(30) Foreign Application Priority Data
Jul. 28, 2011    (JP) .................................. 2011-165349

(51) Int. Cl.
| | | |
|---|---|---|
| *F01D 15/10* | (2006.01) | |
| *H02K 35/02* | (2006.01) | |
| *F03B 13/26* | (2006.01) | |
| *F03B 17/06* | (2006.01) | |

(52) U.S. Cl.
CPC .............. *F01D 15/10* (2013.01); *F03B 13/264* (2013.01); *F03B 17/061* (2013.01); *H02K 35/02* (2013.01); *F05B 2210/16* (2013.01); *Y02E 10/38* (2013.01)

(58) Field of Classification Search
CPC ....................................................... Y02E 10/32
USPC .................... 310/36; 290/43, 54, 1 R; 416/79
See application file for complete search history.

(56) References Cited

U.S. PATENT DOCUMENTS

| | | | | |
|---|---|---|---|---|
| 1,018,678 | A * | 2/1912 | Nelson ..................... | F02B 63/04 290/4 D |
| 3,204,110 | A * | 8/1965 | Masuda .......................... | 290/42 |
| 3,965,365 | A * | 6/1976 | Parr ................................ | 290/53 |
| 4,076,463 | A * | 2/1978 | Welczer ......................... | 417/331 |
| 4,279,124 | A * | 7/1981 | Schremp ............... | F03B 13/183 290/53 |

(Continued)

FOREIGN PATENT DOCUMENTS

| | | |
|---|---|---|
| DE | 102005017040 A1 | 11/2006 |
| GB | 2473659 A * | 3/2011 .............. F03B 13/20 |

(Continued)

OTHER PUBLICATIONS

International Search Report of corresponding International Application No. PCT/JP2012/004000, dated Sep. 13, 2012.

(Continued)

*Primary Examiner* — Tulsidas C Patel
*Assistant Examiner* — Charles Reid, Jr.
(74) *Attorney, Agent, or Firm* — Global IP Counselors, LLP

(57) ABSTRACT

The dynamo of the present invention is provided in the flow field of a fluid, and has: a columnar oscillating body, one end of the oscillating body being supported in the flow field of the fluid by a shaft that is parallel to the flow direction of the fluid, and the oscillating body being moved reciprocally by self-excited oscillation about the shaft; and an electricity generation unit for generating electrical energy in response to the reciprocal oscillation of the oscillating body.

9 Claims, 13 Drawing Sheets

(56) References Cited

U.S. PATENT DOCUMENTS

| | | | |
|---|---|---|---|
| 4,313,711 A * | 2/1982 | Lee | 415/7 |
| 4,319,454 A * | 3/1982 | Lucia | F03B 13/1815 |
| | | | 417/332 |
| 4,389,843 A * | 6/1983 | Lamberti | F03B 13/1815 |
| | | | 290/42 |
| 4,408,455 A * | 10/1983 | Montgomery | F03B 13/1815 |
| | | | 60/497 |
| 4,480,966 A * | 11/1984 | Smith | F03B 13/1815 |
| | | | 417/332 |
| 5,324,169 A * | 6/1994 | Brown et al. | 416/83 |
| 6,022,173 A * | 2/2000 | Saxon | 405/163 |
| 6,876,094 B2 * | 4/2005 | Jacobsen | 290/1 R |
| 7,042,112 B2 * | 5/2006 | Wood | 290/53 |
| 7,400,055 B2 * | 7/2008 | Nagao | 290/44 |
| 7,579,704 B2 * | 8/2009 | Steenstrup | F03B 11/06 |
| | | | 290/42 |
| 7,808,120 B2 * | 10/2010 | Smith | 290/42 |
| 7,989,975 B2 * | 8/2011 | Clement | F03B 13/20 |
| | | | 290/53 |
| 8,008,792 B2 * | 8/2011 | Gray | 290/42 |
| 8,049,356 B2 * | 11/2011 | Chervin | F03B 13/20 |
| | | | 290/53 |
| 8,102,065 B2 * | 1/2012 | Hobdy | 290/1 R |
| 2003/0184096 A1 * | 10/2003 | Newman | 290/54 |
| 2005/0121915 A1 | 6/2005 | Leijon et al. | |
| 2007/0176430 A1 * | 8/2007 | Hammig | 290/54 |
| 2008/0053084 A1 | 3/2008 | Stansby et al. | |
| 2008/0088132 A1 * | 4/2008 | Laube von Laubenfels | 290/53 |
| 2009/0160191 A1 * | 6/2009 | Beane | F03B 13/20 |
| | | | 290/53 |
| 2009/0218822 A1 * | 9/2009 | Rink | 290/54 |
| 2010/0226798 A1 * | 9/2010 | Kingston | 417/330 |
| 2010/0229545 A1 * | 9/2010 | Griffin et al. | 60/496 |
| 2010/0237631 A1 * | 9/2010 | Yu | 290/1 R |
| 2011/0042954 A1 | 2/2011 | Werjefelt | |
| 2012/0000193 A1 * | 1/2012 | Kingston | 60/500 |
| 2013/0009402 A1 * | 1/2013 | Williams | 290/53 |
| 2013/0207403 A1 * | 8/2013 | Eichhorn | 290/1 R |
| 2013/0269333 A1 * | 10/2013 | Williams et al. | 60/506 |

FOREIGN PATENT DOCUMENTS

| | | | | |
|---|---|---|---|---|
| IT | WO 2013076573 A1 * | 5/2013 | | F03D 9/007 |
| JP | S50-135454 A | 10/1975 | | |
| JP | S61-028765 A | 2/1986 | | |
| JP | S61-028766 A | 2/1986 | | |
| JP | S61-261676 A | 11/1986 | | |
| JP | 2001-157433 A | 6/2001 | | |
| JP | 2003-164136 A | 6/2003 | | |
| JP | 2006-132397 A | 5/2006 | | |
| JP | 2006-291842 A | 10/2006 | | |
| JP | 2007-195364 A | 8/2007 | | |
| JP | 2008-011669 A | 1/2008 | | |
| JP | 2010-136535 A | 6/2010 | | |
| JP | 2011-120360 A | 6/2011 | | |
| WO | 2004005710 A1 | 1/2004 | | |

OTHER PUBLICATIONS

Search Report in the corresponding European Patent Application No. 12817134.5 dated Nov. 18, 2015.

* cited by examiner

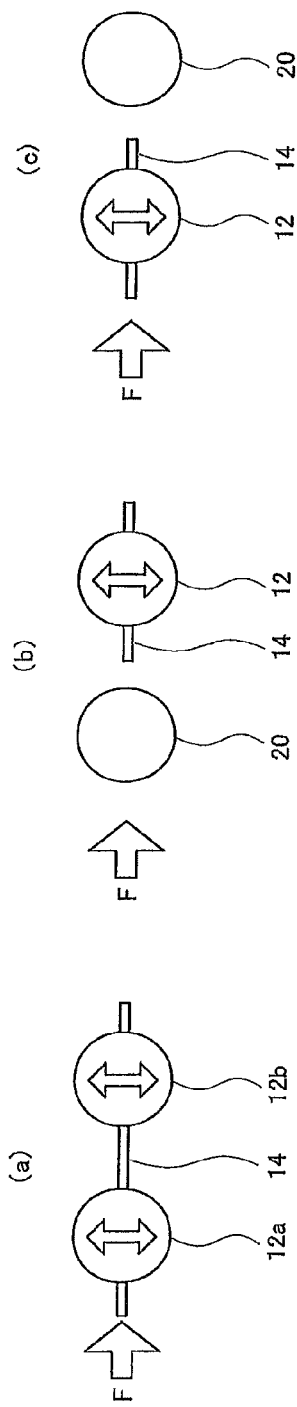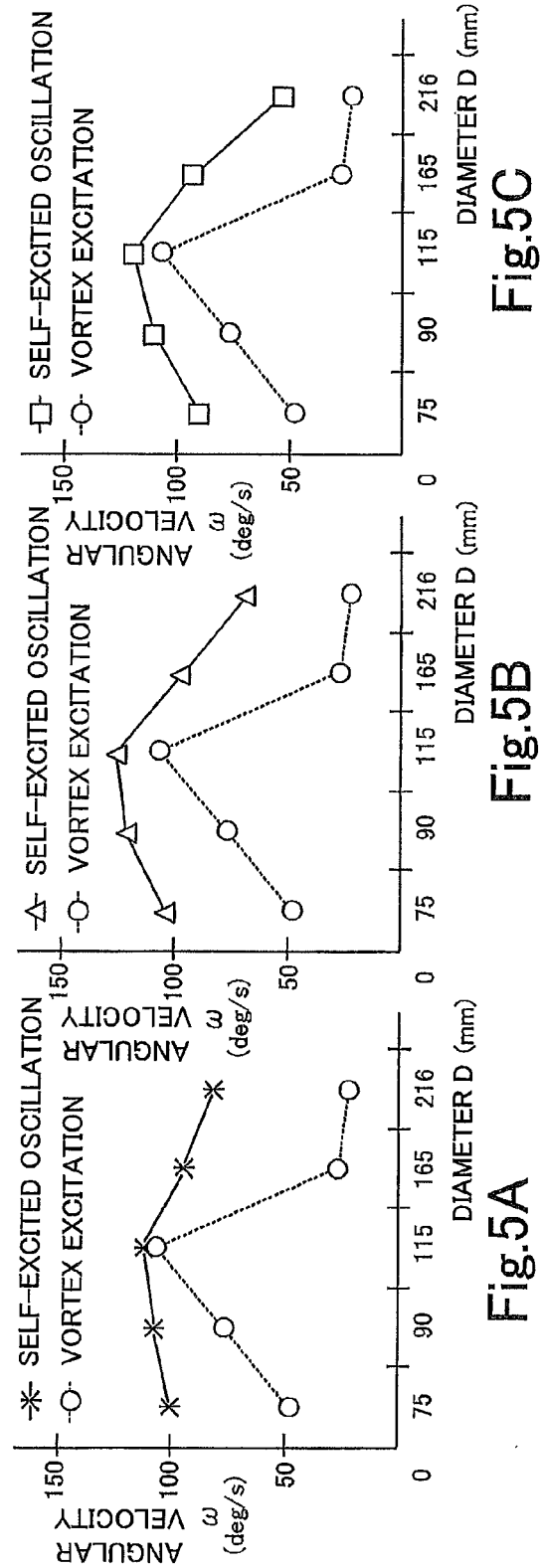
Fig.5A  Fig.5B  Fig.5C

DYNAMO WITH COLUMNAR OSCILLATOR

TECHNICAL FIELD

The present invention relates to a dynamo for converting oscillation energy to electric energy to generate electric power.

BACKGROUND ART

Dynamos, which convert natural energy of fluids, such as tidal currents and river flows, to electric energy, have been known. Such dynamos employ mechanisms to spin a rotor by turning rotating components, such as propeller blades, with, for example, wind or water flow.

Such rotating components, however, have complex structures, which may increase the manufacturing costs of the dynamos. Additionally, the rotating components in use may be damaged by a drifting object, which is present in a flow field and entangled in the rotating components. Creatures present in the flow field, such as fish, may also be entangled in the rotating components to be harmed.

Another type of dynamo, which has been known, uses an oscillator that is located in a flow field of a fluid to oscillate. Specifically, this type of dynamo includes a columnar body placed with its longitudinal direction intersecting with the flow direction of the fluid, and the oscillation of the columnar body causes a permanent magnet to move inside coils, which generates an induced current to the coils thereby generating electricity.

In other words, this type of dynamo described above effectively uses the oscillation energy of fluid-induced oscillations, caused in the flow field, of the oscillator to generate electricity.

CITATION LIST

Patent Literature

Patent Literature 1: Japanese Patent Application Laid-Open No. 2008-011669

SUMMARY OF INVENTION

Technical Problem

The dynamo described above includes an elastic member that elastically supports the columnar body, and this elastic member facilitates the conversion of the natural energy of the fluid to the oscillation energy of the columnar body. The elastic member in use, however, may suffer a fatigue fracture because of the continual and repeated oscillations of the columnar body, and hence this type of dynamo is unlikely to withstand a prolonged use.

It is therefore an object of the present invention to provide a dynamo capable of obtaining the electric power, which is generated through the oscillation of an oscillator caused by a fluid flow, with a simple arrangement.

Means for Solving the Problem

One embodiment of the present invention is a dynamo installable in a flow field of a fluid. The dynamo includes:

a columnar oscillator configured to oscillate about an axis due to a self-excited oscillation, the axis being parallel to a flow direction of the fluid and pivotally supporting at one end of the columnar oscillator in the flow field of the fluid; and an electricity generator configured to generate electric energy corresponding to an oscillation of the oscillator.

Preferably, the oscillator has a specific gravity smaller than that of the fluid, and the oscillator is pivotally supported at the end at a vertically lower end side thereof by the axis.

Preferably, when the oscillator is a first oscillator, the dynamo further includes:

a second columnar oscillator being configured to oscillate about the axis pivotally supporting at an vertically lower end side of the second columnar oscillator in the flow field of the fluid at an upstream side or a downstream side of the first oscillator in the flow direction of the fluid, the second oscillator having a specific gravity smaller than that of the fluid; and a support configured pivotally support the first oscillator and the second oscillator.

The dynamo may include a controller configured to cause at least one of a position of the first oscillator and a position of the second oscillator to move so as to adjust a distance between the axes of the first oscillator and the second oscillator in response to a flow velocity of the fluid.

The support may extend in the flow direction of the fluid and the support may support a plurality of oscillators apart from each other.

The dynamo may further includes an oscillation regulator configured to regulate the oscillation of the oscillator, the oscillation regulator being apart from the oscillator on at least one of an upstream side and a downstream side of the oscillator in the flow field.

The dynamo preferably includes a controller configured to cause at least one of the position of the oscillator and a position of the oscillation regulator to move so as to adjust a distance between the axes of the oscillator and the oscillation regulator in response to the flow velocity of the fluid.

The dynamo may include an adjuster configured to adjust a natural frequency of the oscillator.

The electricity generator may include conductors provided along a path of the oscillator, and a magnetic field generator attached to the oscillator and applying a magnetic field to the conductors facing the magnetic field generator, the magnetic field varying due to the oscillation of the oscillator to generate the electric energy.

The electricity generator may include a conductor attached to the oscillator, and magnetic field generators provided along the path of the oscillator and applying a magnetic field to the conductor facing the magnetic field generators, the magnetic field varying around the conductor due to the oscillation of the oscillator to generate the electric energy.

Preferably the fluid is a liquid having a liquid surface, the oscillator is supported at a vertically upper end thereof by the axis, and the dynamo further includes a float connected to the oscillator for causing the oscillator to float on the liquid surface and for providing a restoring force to the oscillation.

In this embodiment, the float may include a pair of arms each extending from the axis of the oscillator in a direction which is orthogonal to the axis and each extending toward opposite side from the axis in view of the liquid surface, and a pair of float bodies each being provided at an end of the each arm, each of the float bodies having a specific gravity smaller than that of the liquid configured to generate the restoring force when one of the pair of float bodies is submerged in the liquid more than the other float body during the oscillation.

The dynamo preferably includes an adjustment mechanism provided for adjusting each length of the arm.

Advantageous Effects of Invention

The dynamo described above is capable of obtaining the electric power, which is generated through the oscillation of an oscillator caused by a fluid flow, with a simple arrangement.

BRIEF DESCRIPTION OF DRAWINGS

FIGS. 5A to 5C are graphs of examples changing in angular velocity of an oscillator in the first embodiment with respect to the diameter of the oscillator.

DESCRIPTION OF EMBODIMENTS

A dynamo according to the present invention will now be described in detail.

The dynamo according to the present embodiment is a system for converting the natural energy of a fluid such as a tidal current and a river flow to the electric energy. Specifically, it is a system for converting the oscillation energy of an oscillator to the electric energy, the oscillation energy generated due to the location of the oscillator in a flow field of the fluid. For this dynamo, the fluid may be a gas or a liquid. With the fluid in the form of a gas, the dynamo includes an arrangement for converting the oscillation energy of an oscillator, oscillating due to wind, to the electric energy. This arrangement is different from an arrangement of a wind power generator that uses wind to spin a rotating component, such as a propeller blade, to rotate a rotor. With the fluid in the form of a liquid, the dynamo includes an arrangement for converting the oscillation energy of an oscillator, positioned on the seabed or in a river, to the electric energy through a seabed tidal current or a river water flow (including an agricultural water channel and an industrial water channel). This arrangement is different from an arrangement of a hydroelectric generator that uses a water flow to turn a rotor.

The dynamos according to the first embodiment and the second embodiment to be described hereinafter are to be installed in a flow field of a fluid. These dynamos are columnar oscillators and each includes a columnar oscillator and an electricity generator. The oscillator is supported at its one end in the flow field of the fluid by an axis parallel to a flow direction of the fluid and oscillates about the axis due to self-excited oscillations. The electricity generator generates the electric energy corresponding to the oscillations of the oscillator.

First Embodiment

A dynamo according to the first embodiment includes a columnar oscillator having a specific gravity smaller than that of a fluid and configured to oscillate about an axis being parallel to a flow direction of the fluid and supporting at one end of the columnar oscillator in the flow field of the fluid, and an electricity generator configured to generate electric energy corresponding to an oscillation of the oscillator.

This arrangement enables the dynamo according to the first embodiment to eliminate the need for an elastic member used in a conventional dynamo that converts the oscillation energy to the electric energy. Consequently, the dynamo according to the first embodiment can obtain the electric energy, which is generated through the oscillation of the oscillator caused by a fluid flow, with a simple arrangement. Additionally, the dynamo according to the first embodiment, which includes no elastic member, is superior in durability to a dynamo including an elastic member.

Figure 1:
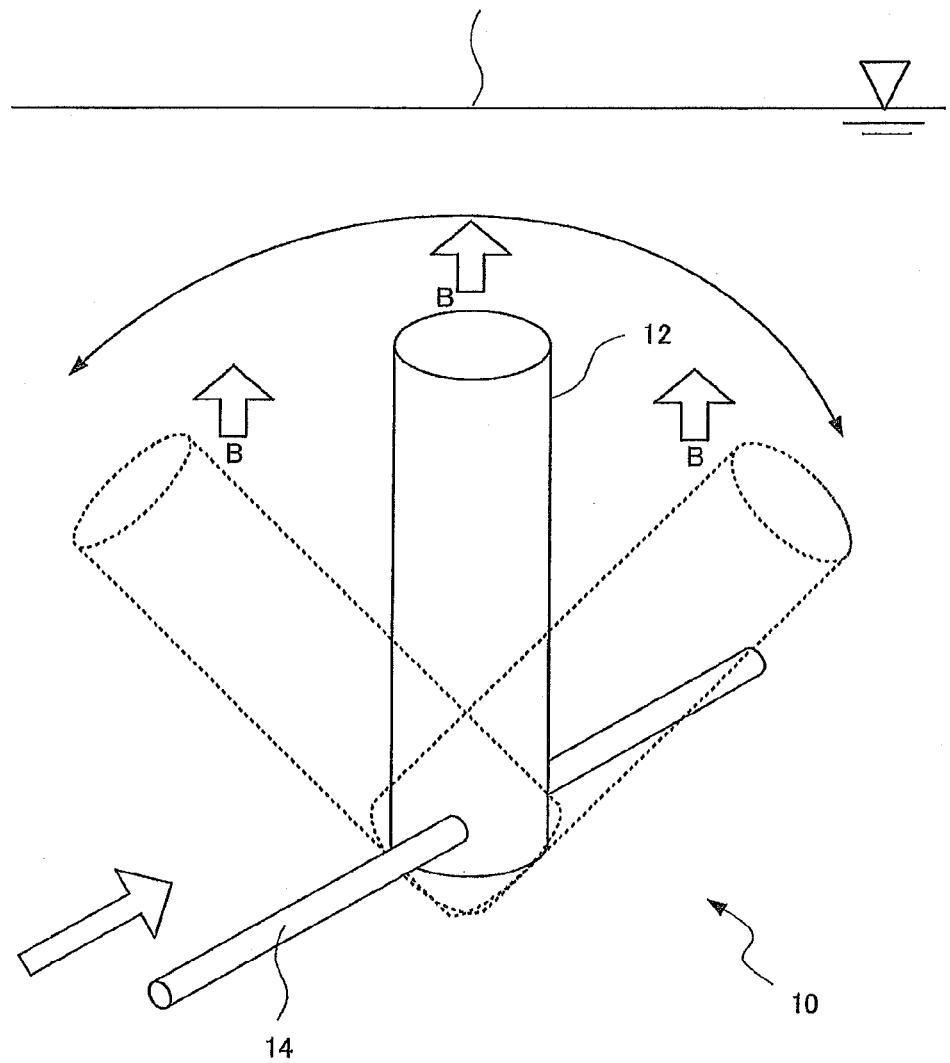
FIG. 1 is a schematic block diagram of a dynamo according to a first embodiment.

FIG. 1 is a schematic block diagram of a dynamo 10 according to the first embodiment.

The dynamo 10 includes an oscillator 12, a support 14, and an electricity generator 16 (see FIG. 2) and is installed in a fluid having a flow field F. The oscillator 12 is shaped into a column extending in a direction orthogonal to the flow direction (the direction marked with the arrow of the flow field F in FIG. 1) of the fluid and has a specific gravity smaller than that of the fluid. The oscillator 12 is located in the flow field F of the fluid and thereby oscillates about the support 14 parallel to the flow direction of the fluid, the support 14 pivotally supporting a vertically lower end side of the oscillator 12 in the flow field F. This oscillation is due to Karman vortex excitation caused because of the location of the oscillator 12 in the flow field F. The oscillator 12 has a natural frequency dependent on the mass and the length of the oscillator 12.

Here, the oscillator 12 is preferably made with, for example, a hollow component of vinyl chloride, fiber-reinforced plastic, or steel for the fluid in the form of water, and the oscillator 12 is preferably made with, for example, polyvinyl chloride or Hypalon for the fluid in the form of air in order to have a specific gravity smaller than that of the fluid. In order to make the specific gravity of the oscillator 12 smaller than that of the air for the fluid in the form of air, the inside of the hollow oscillator 12 is preferably filled with helium or hydrogen, which has a specific gravity smaller than that of the air. The oscillator 12, which is a circular cylinder, may be another type of columnar body etc., such as a triangular prism, a rectangular column, and a polygonal column, instead of the circular cylinder. In order to generate the Karman vortex excitation for the circular cylindrical oscillator 12 positioned in the flow field F with the fluid (for example, water) at a flow velocity of 1 to 5 in/second, the oscillator 12 preferably has a diameter from 100 to 3000 mm so that, for example, the Reynolds number is in a range from $10^5$ to $10^7$. The oscillator 12 preferably has a length of, for example, 50 to 2000 cm.

The support 14 extends in parallel with the flow direction of the fluid and pivotally supports a portion of the oscillator 12 at the vertically lower end side rotatably. Because the oscillator 12 has the specific gravity smaller than that of the fluid, the buoyancy acting upon the oscillator 12 is larger than gravity acting upon the oscillator 12. A vertically upward force B, thus, continuously acts on the oscillator 12 as a restoring force for restoring the oscillator 12 to its vertically extending state. Consequently, the oscillator 12 oscillates about the support 14 pivotally supporting the vertically lower end side of the oscillator 12 due to the Karman vortex excitation and the vertically upward force B. This oscillator 12 acts as an inverted pendulum with its vertically lower end side constituting the axis point.

Figure 2:
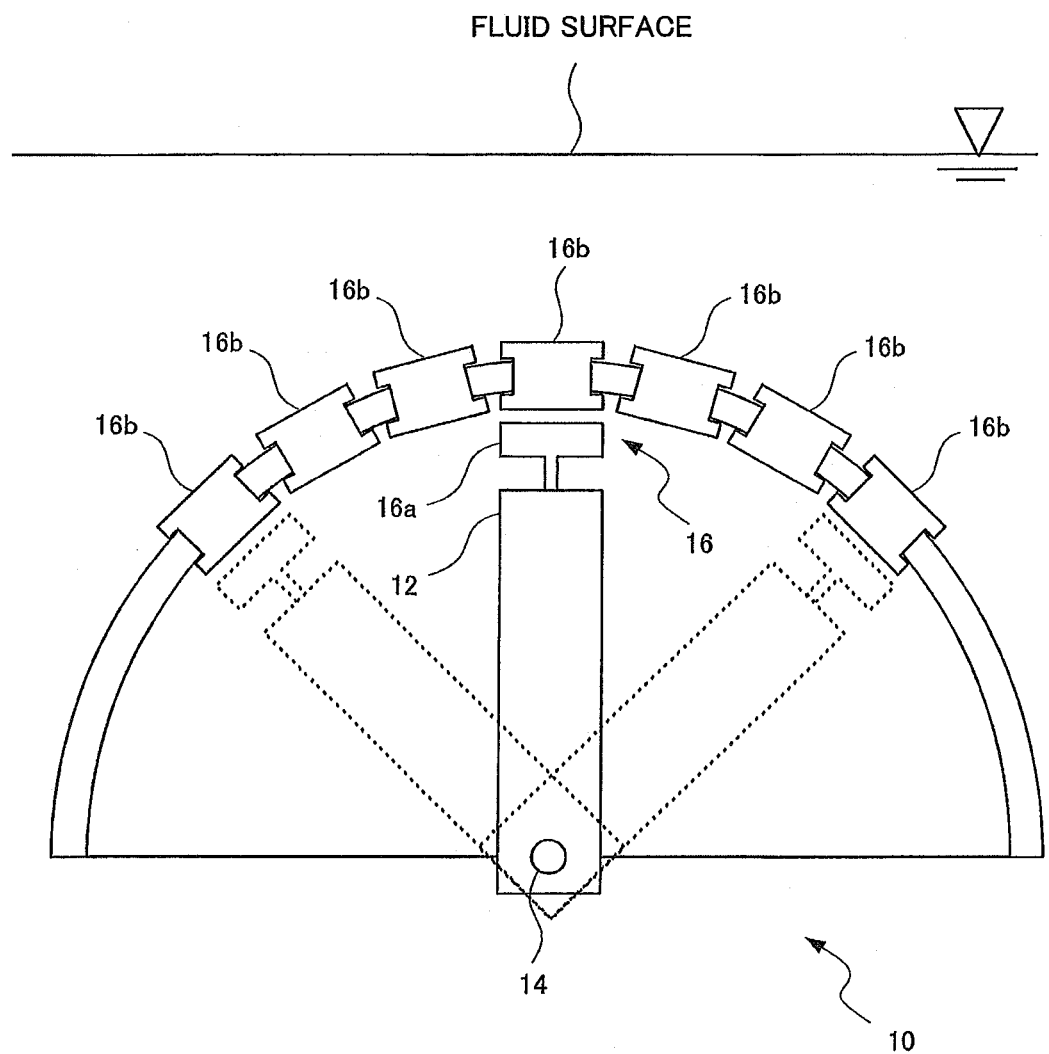
FIG. 2 is a schematic diagram for describing the dynamo illustrated in FIG. 1.

An arrangement of the electricity generator 16 will now be described with reference to FIG. 2. The electricity generator 16 includes, for example, a magnetic field generator 16a, such as a permanent magnet, and conductors 16b, such as coils. The magnetic field generator 16a is attached to the oscillator 12 at its end at the vertically upper end side to move with the oscillator 12. The conductors 16b are spaced along the oscillation path of the oscillator 12 and arranged to face the magnetic field generator 16a, which moves with the oscillator 12, with a space therebetween. In the electricity generator 16, the oscillation of the oscillator 12 imparts a relative motion between the conductors 16b and the applied magnetic field of the magnetic field generator 16a, which, as a result, brings about a change in intensity of the magnetic field applied to the conductors 16b. The change in intensity of the magnetic field applied to the conductors 16b causes electromagnetic induction, resulting in an induced current flowing in the conductors 16b. The electric energy is thus generated.

This arrangement can convert the oscillation energy of the oscillator 12 to the electric energy directly and, thus, can yield improved efficiency of conversion from the oscillation energy to the electric energy in comparison with an arrangement with indirect conversion to the electric energy, as in the case in which a power generating motor connected to an oscillator 12 is rotated through the oscillation energy of the oscillator 12 to generate electricity.

As described above, the dynamo according to the first embodiment eliminates the need for an elastic member for the oscillator to oscillate and thus can reduce the manufacturing costs. Additionally, the dynamo according to the present embodiment, which includes no elastic member, is superior in durability to a dynamo including an elastic member.

When the energy conversion efficiency η the oscillator 12 in the dynamo according to the present embodiment is defined as below, the energy conversion efficiency η of 76% can be achieved under optimum conditions.

Energy conversion efficiency η (%)=(The maximum power of the oscillator 12)/($\frac{1}{2} \cdot \rho \cdot d \cdot L \cdot U^3$), where ρ represents the density of the fluid, d represents the diameter of the oscillator 12, L represents the length of the oscillator 12, and U represents the flow velocity of the fluid.

First Modification

Figure 3:
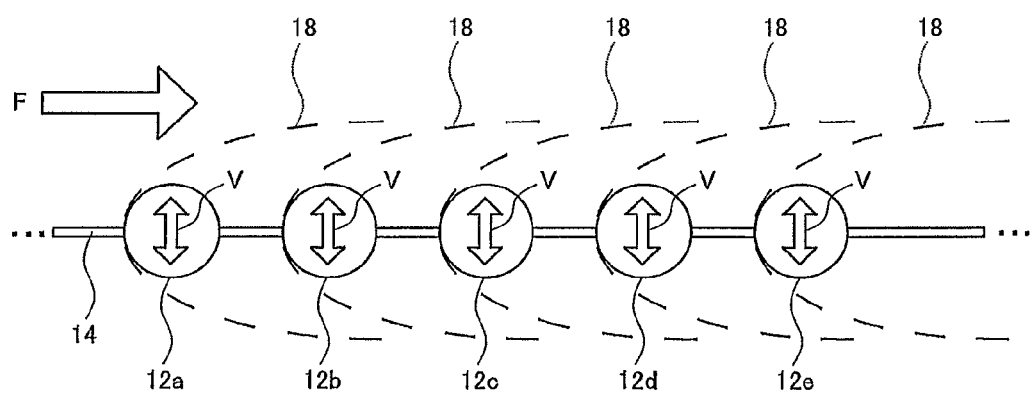
FIG. 3 is a schematic diagram for describing a modification of the dynamo according to the first embodiment.

FIG. 3 is a schematic diagram for describing a modification of the dynamo 10 according to the present embodiment. This modification is different from the embodiment described above in that oscillators 12a, 12b, 12c, 12d, 12e, . . . are arrayed in a line in the flow field F in the flow direction. This modification is otherwise similar to the arrangement of the present embodiment, and hence the description of its arrangement and functions will be omitted.

In this modification, the oscillators 12a, 12b, 12c, 12d, 12e, . . . are positioned in proximity to each other. In the description hereinafter, the oscillators 12a, 12b, 12c, 12d, and 12e are described as representatives of the oscillators 12a, 12b, 12c, 12d, 12e, . . . . Although a distances between the axes of the oscillators 12a, 12b, 12c, 12d, and 12e varies with the type of fluid, a flow velocity condition, and the like, exemplary distances between the axes are obtained by multiplying a diameter d (where the diameter of the circular cylindrical shape of the oscillators 12a, 12b, 12c, 12d, and 12e is denoted as d) one to three times.

The oscillators 12a to 12e are pivotally supported at each vertically lower end side by the support 14 common to the oscillators. A magnetic field generator (not illustrated) similar to the magnetic field generator 16a is provided to each of the oscillators 12a to 12e at an end at the vertically upper end side of each oscillator, as with the oscillator 12 illustrated in FIG. 2. Conductors (not illustrated) similar to the conductors 16b illustrated in FIG. 2 are provided in positions, which are along the oscillation path of each of the oscillators 12a to 12e and face the magnetic field generator. The oscillation of each of the oscillators 12a to 12e imparts relative motions between the conductors and the applied magnetic field of the magnetic field generator, and electricity is generated through these motions.

Such a dynamo 10, with the oscillators 12a to 12e arrayed in a line in the flow field F in the flow direction, allows an oscillator adjacent to each oscillator at the upstream side or the downstream side thereof to generate larger oscillation energy. Specifically, a separated flow 18 caused around the oscillator 12a affects the oscillation of the oscillator 12b adjacent at the downstream side, inducing an oscillation V having an amplified amplitude for the oscillator 12b. A wide range of fluid flow velocity is available to maintain this oscillation V. Additionally, the oscillation V of the oscillator 12b affects the oscillator 12a, inducing the oscillation V for the oscillator 12a simultaneously with the oscillator 12b. Furthermore, the oscillation V is induced for the oscillators 12c to 12e as with the oscillators 12a and 12b. In other words, this modification can maintain the oscillation V with ease even with a change in flow velocity of the fluid and enable each of the oscillators 12a to 12e to generate an oscillation of self-excitation (self-excited oscillation) with an amplified amplitude, in contrast to the embodiment described above with the sole oscillator 12.

Here, the oscillations of the oscillators 12a to 12e are out of phase with each other. In other words, the oscillations of the oscillators 12a to 12e are independent of each other, and the oscillations are different in phase between the oscillators 12a to 12e.

This modification, which uses the effect of oscillation propagation by the oscillators 12a to 12e, . . . , can be applied effectively to a dynamo that generates electricity from natural energy, such as wind, tidal currents, and river flows, using fluid-induced oscillations. Additionally, this modification is effective in that it outputs more electric energy than the use of sole oscillator 12 as illustrated in FIGS. 1 and 2. Furthermore, this modification allows multiple oscillators arranged in proximity with each other and thus can improve the ratio of obtainable electric energy to a footprint of a dynamo.

Second Modification

FIGS. 4A to 4D are schematic diagrams for describing another modification of the dynamo 10 according to the present embodiment. This modification is different from the embodiment described above in that an oscillation regulator 20 for regulating the oscillations of the oscillators 12a and 12b is positioned in the flow field F. This modification is otherwise similar to the arrangement of the present embodiment, and hence the description of its arrangement and functions will be omitted.

The oscillation regulator 20 is a circular cylinder extending in the vertical direction and fixedly arranged apart from the oscillators 12a and 12b in the vicinity of the oscillators 12a and 12b. The oscillation regulator 20 may be, for example, fixed to the supporter 14. The oscillation regulator 20 has high stiffness such that the oscillation regulator 20, positioned in the flow field F, suffers no displacement due to the flow force of the fluid or the oscillations of 12a and 12b. Although the oscillation regulator 20 has an identical diameter to that of the oscillator 12, which is a circular cylinder, and the lengths of the circular cylinders are also identical to each other, the diameters and the lengths may be different. In addition, although the oscillation regulator 20 is a circular cylinder, the oscillation regulator 20 may be another type of columnar body etc., such as a triangular prism, a rectangular column, and a polygonal column, instead of the circular cylinder.

The oscillation regulator 20 is positioned at at least one of the upstream side and the downstream side of the oscillators 12a and 12b apart from the oscillators 12a and 12b and can thereby regulate the oscillations of the oscillators 12a and 12b. Here, the regulation on the oscillations of the oscillators 12a and 12b includes maintaining the oscillations in response to a change in flow velocity of the fluid, and, furthermore, amplifying the amplitudes of the oscillations.

Figure 4A:
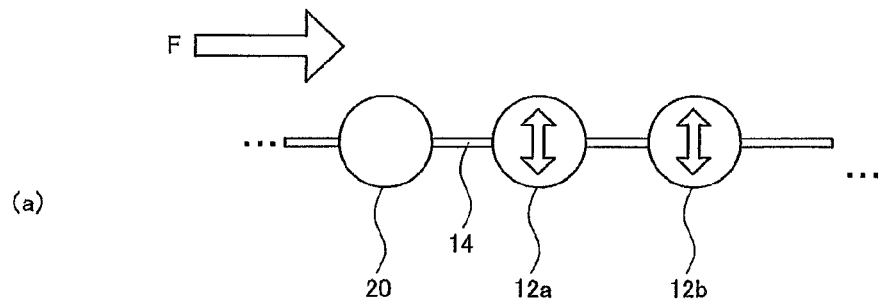
FIGS. 4A to 4D are schematic diagrams for describing another modification of the dynamo according to the first embodiment.
Figure 4B:
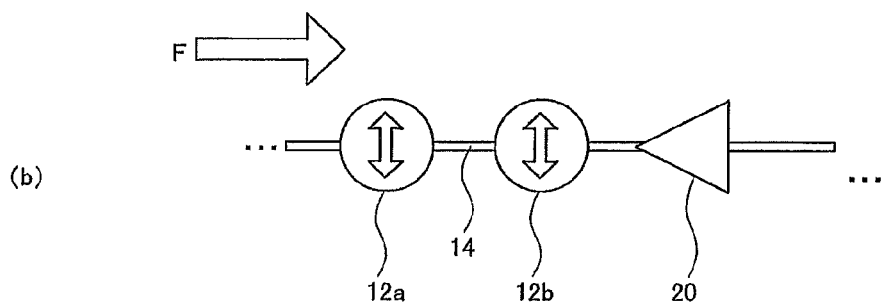
Figure 4C:
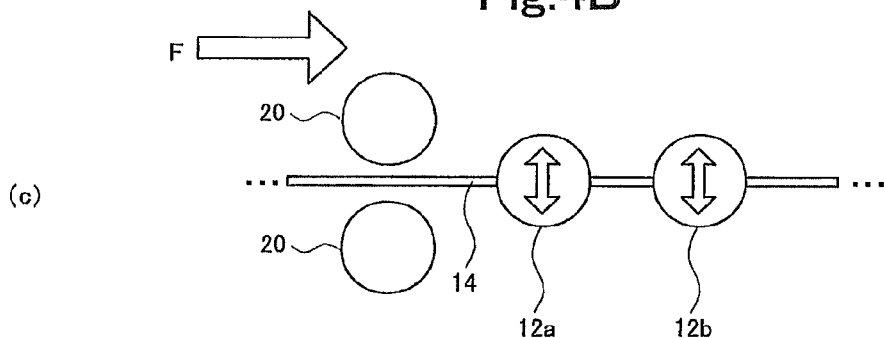
Figure 4D:
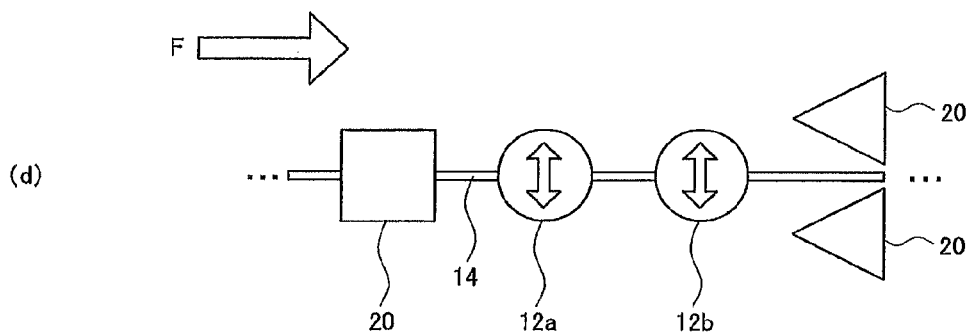

The oscillation regulator 20 may be located at the upstream side of the oscillators 12a and 12b in the flow field F as illustrated in FIG. 4A or at the downstream side thereof as illustrated in FIG. 4B. The oscillation regulator 20 may also be arranged along the flow direction of the flow field F, or the positions of the oscillation regulator 20 and the oscillator 12 in a direction orthogonal to the flow direction may be shifted from each other. A plurality of oscillation regulators 20 may be provided in a direction orthogonal to the flow direction of the flow field F at opposite sides across the support 14 as illustrated in FIG. 4C or may be provided at the upstream side and at the downstream side of the oscillators 12a and 12b as illustrated in FIG. 4D.

Although the distance between the axes of the oscillator 12 and the oscillation regulator 20 varies with the type of fluid, a flow velocity condition, and the like, an exemplary distance between the axes is obtained by multiplying a diameter d (where the diameters of the circular cylindrical shapes of the oscillator 12 and the oscillation regulator 20 are denoted as d) one to three times. This distance between the axes described above is set in a range such that the separated flow caused around the oscillation regulator 20 can regulate the oscillations of the oscillators 12a and 12b efficiently.

FIGS. 5A to 5C are diagrams of examples changing in angular velocity of the oscillator 12 or 12b with respect to the diameter of the oscillator 12 or 12b, with the oscillator 12a or the oscillation regulator 20 positioned in proximity to the oscillator 12 or 12b.

In FIG. 5A, a solid line represents a change in angular velocity ω of the oscillator 12b with the diameter d of the oscillator 12b varied under conditions where the oscillator 12a, shaped into a circular cylinder with the diameter of 115 mm, is positioned at the upstream side of the flow field F, the distance between the axes of the oscillator 12a and the oscillator 12b is 14 to 20 cm, water is used for the fluid, and the flow velocity is 1 m/second. For comparison, a dashed line represents a change in angular velocity ω of the oscillator 12b with the diameter d of the oscillator 12b varied with the oscillator 12b positioned alone in the flow field F. As described above, when the two oscillators 12a and 12b are positioned in proximity, a wide range of flow velocity is available to maintain the oscillations, and self-excited oscillations with amplified amplitudes of the oscillations are induced for the oscillators 12a and 12b. In contrast, when the oscillator 12b is used alone, the oscillator 12b oscillates due to the Karman vortex excitation.

It is understood from FIG. 5A that the angular velocity ω of the oscillator 12b changes in response to variations in diameter d of the oscillator 12b, when the two oscillators 12a and 12b are positioned in proximity. For example, the largest angular velocity response is obtained with the diameter d of the oscillator 12b at 115 mm. Additionally, it is understood from FIG. 5A that the self-excited oscillations, which are induced for the oscillators 12a and 12b by positioning the oscillators 12a and 12b in proximity, yield larger angular velocity responses than the Karman vortex excitation caused with the oscillator 12b used alone.

In FIG. 5B, a solid line represents a change in angular velocity ω of the oscillator 12 with the diameter d of the oscillator 12 varied under conditions where the oscillation regulator 20, shaped into a circular cylinder with the diameter of 115 mm, is positioned at the upstream side of the flow field F, the distance between the axes of the oscillation regulator 20 and the oscillator 12 is 14 to 20 cm, water is used for the fluid, and the flow velocity is 1 m/second. As in FIG. 5A, a dashed line represents a change in angular velocity ω of the oscillator 12 with the diameter d of the oscillator 12 varied with the oscillator 12 positioned alone in the flow field F. It is understood from FIG. 5B that the angular velocity ω of the oscillator 12 changes with the diameter d of the oscillator 12 varied when the oscillation regulator 20 is positioned at the upstream side of the oscillator 12 in proximity. It is also understood that the angular velocity of the oscillator 12, with the oscillation regulator 20 positioned at the upstream side of the oscillator 12 in proximity, is larger at any diameter d than that with the oscillator 12 used alone.

In FIG. 5C, a solid line represents a change in angular velocity ω of the oscillator 12 with the diameter d of the oscillator 12 varied under conditions where the oscillation regulator 20, shaped into a circular cylinder with the diameter of 115 mm, is positioned at the downstream side of the flow field F, the distance between the axes of the oscillation regulator 20 and the oscillator 12 is 14 to 20 cm, water is used for the fluid, and the flow velocity is 1 m/second. As in FIG. 5A, a dashed line represents a change in angular velocity ω of the oscillator 12 with the diameter d of the oscillator 12 varied with the oscillator 12 positioned alone in the flow field F. It is understood from FIG. 5C that the angular velocity ω of the oscillator 12 changes with the diameter d of the oscillator 12 varied when the oscillation regulator 20 is positioned at the downstream side of the oscillator 12 in proximity. It is also understood that the angular velocity of the oscillator 12, with the oscillation regulator 20 positioned at the downstream side of the oscillator 12 in proximity, is larger at any diameter d than that with the oscillator 12 used alone.

As described above, the use of a plurality of oscillators 12 or the use of the oscillator 12 in combination with the oscillation regulator 20, rather than the use of the oscillator 12 alone, is preferable in that an angular velocity response can be increased.

Third Modification

Figure 6:
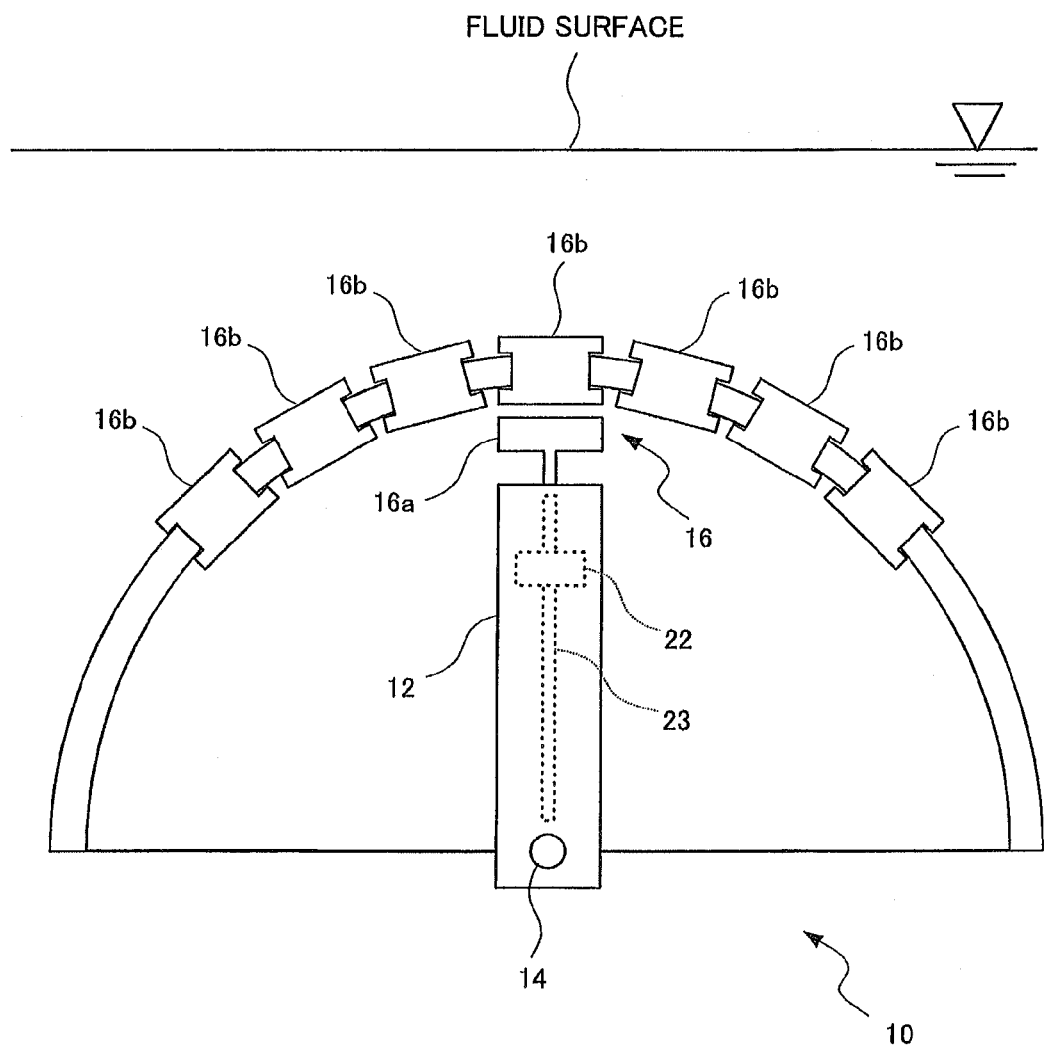
FIG. 6 is a schematic diagram for describing yet another modification of the dynamo according to the first embodiment.

FIG. 6 is a schematic diagram for describing another modification of the dynamo 10 according to the present embodiment. This modification is different from the embodiment described above in that an adjuster 22 is included for adjusting a natural frequency of the oscillator 12. This modification is otherwise similar to the arrangement of the present embodiment, and hence the description of its arrangement and functions will be omitted.

The oscillator 12 is formed to have a hollow inside in which a rod 23 extending in a longitudinal direction of the oscillator 12 is provided. The adjuster 22 is provided on the rod 23 slidably in the longitudinal direction of the oscillator 12. The adjuster 22 may be a weight, for example.

Shifting of the adjuster 22 inside the oscillator 12 changes the natural frequency of the oscillator 12. Specifically, the shifting of the adjuster 22, for example, toward the vertically upper side, i.e., in the direction away from the support 14, increases the moment of inertia and thereby reduces the natural frequency of the oscillator 12. Conversely, the shifting of the adjuster 22 toward the vertically lower side, i.e., in the direction toward the support 14, reduces the moment of inertia and thereby increases the natural frequency of the oscillator 12. Accordingly, for the oscillator 12 used alone, the oscillation amplitude of the oscillator 12 can be amplified by adjusting the natural frequency of the oscillator 12 so as to resonate with the Karman vortex shedding frequency generated around the oscillator 12. On the other hand, for the use of the plurality of oscillators 12 or the use of the oscillator 12 in combination with the oscillation regulator 20, the amplitude of the oscillator 12 can be amplified by adjusting the natural frequency such that a dimensionless flow velocity, defined by a flow velocity, and a characteristic length (for example, the diameter of the oscillator) and the natural frequency of the oscillator, falls within the range of the oscillation excitation of the oscillator 12.

As described above, the natural frequency of the oscillator 12 can be adjusted by shifting the adjuster 22 in the longitudinal direction of the oscillator 12. This allows setting the flow velocity range of the fluid for maintaining the oscillation of the oscillator 12 more widely and amplifying the amplitude of the oscillation, in comparison with an oscillator with no adjuster 22 provided.

Fourth Modification

Figure 7:
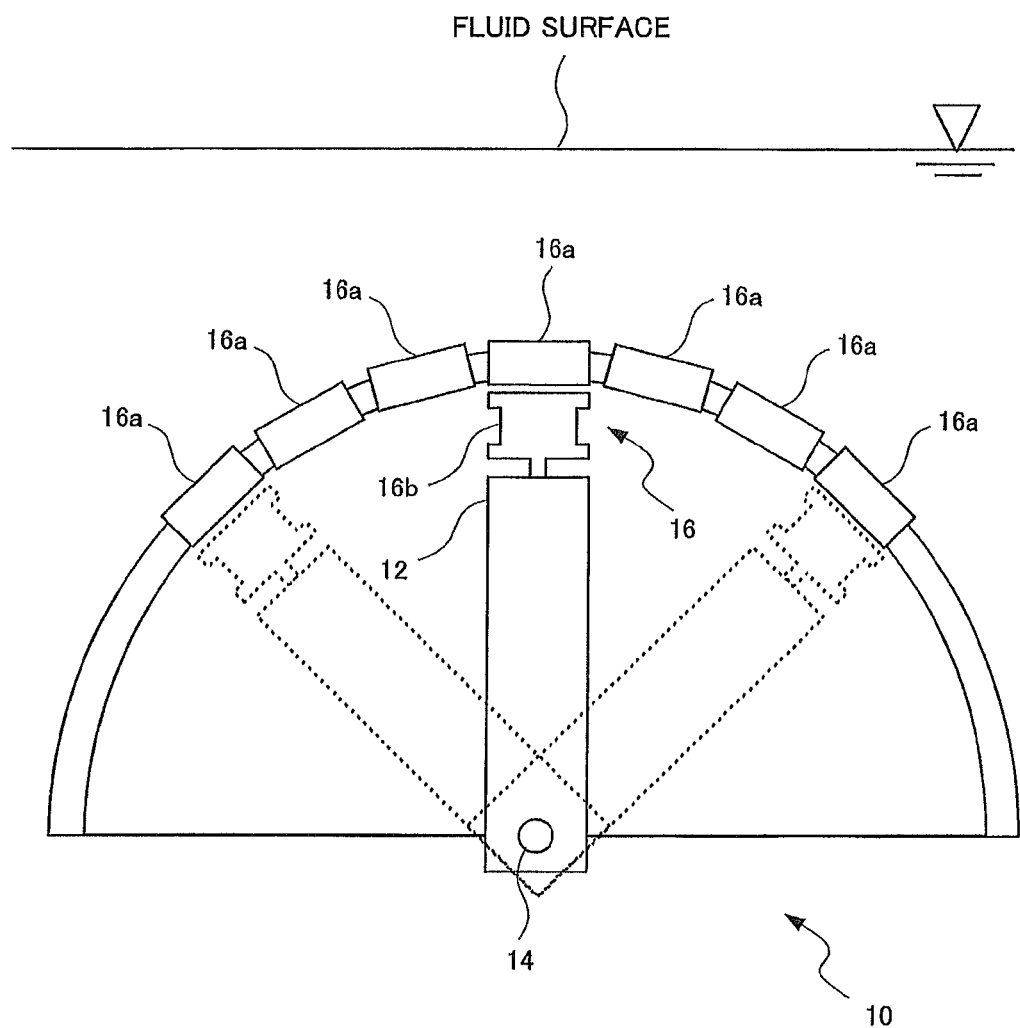
FIG. 7 is a schematic diagram for describing still another modification of the dynamo according to the first embodiment.

FIG. 7 is a schematic diagram for describing another modification of the dynamo 10 according to the present embodiment. This modification is different from the embodiment described above in the arrangement of the electricity generator 16. This modification is otherwise similar to the arrangement of the present embodiment, and hence the description of its arrangement and functions will be omitted.

An electricity generator 16 according to this modification includes a conductor 16b attached to the oscillator 12 at an end of the oscillator at the vertically upper end side to move with the oscillator 12. A plurality of magnetic field generators 16a is spaced in a direction along the oscillation path of the oscillator 12 and arranged to face the conductor 16b, which moves with the oscillator 12, with a space therebetween. In the electricity generator 16, the oscillation of the oscillator 12 imparts a relative motion between the conductor 16b and the applied magnetic field of the magnetic field generators 16a, which, as a result, brings about a change in intensity of the magnetic field applied to the conductor 16b. The change in intensity of the magnetic field applied to the conductor 16b causes electromagnetic induction, resulting in an induced current flowing in the conductor 16b. The electric energy is thus generated.

This modification also can convert the oscillation energy of the oscillator 12 to the electric energy directly as in the embodiment described above, and thus, can yield improved efficiency of conversion from the oscillation energy to the electric energy in comparison with an arrangement with indirect conversion to the electric energy, as in the case in which a power generating motor connected to an oscillator 12 is rotated through the oscillation energy of the oscillator 12 to generate electricity.

Other Modifications

Figure 8:
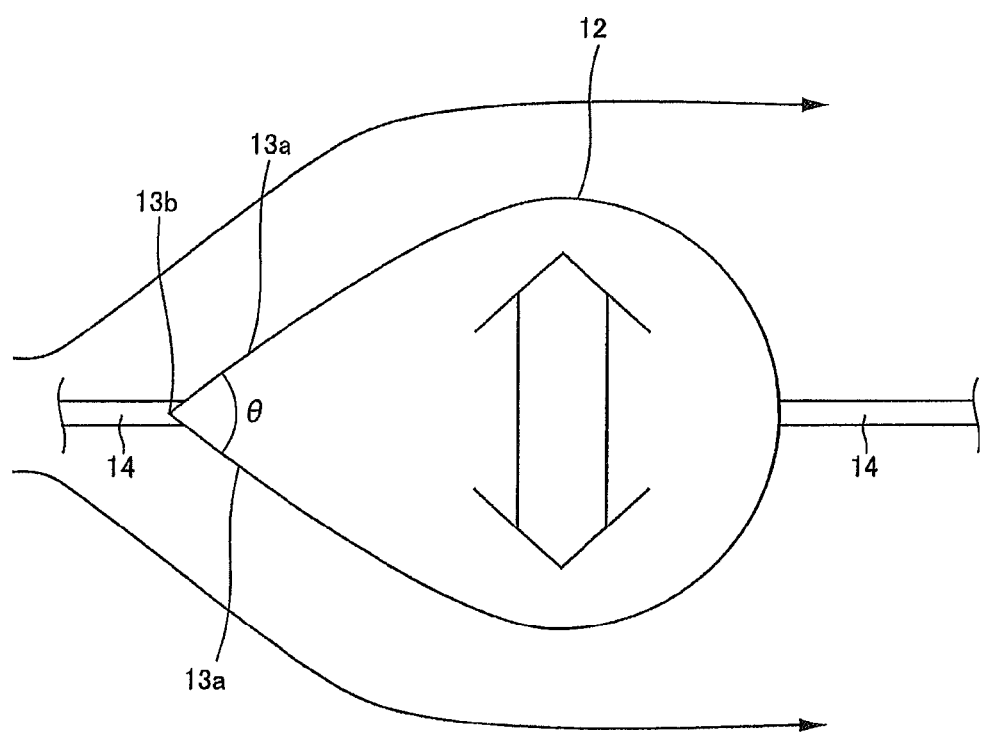
FIG. 8 is a schematic diagram for describing modification of the sectional shape of the oscillator according to the first embodiment.

Although a circular cylinder having a circular section is used for the oscillator 12 in the embodiment described above and in the first to fourth modifications, a section of the oscillator 12 may have a shape, as illustrated in FIG. 8, formed by a circular arc connected to straight lines 13a and 13a which intersect with each other at a projection 13b. The orientation of this oscillator 12 is preferably set such that the projection 13b faces the upstream side in the flow field F of the fluid. This sectional shape has an angle θ of the projection 13b between the straight lines 13a and 13a, and the angle θ may be varied with the flow velocity and the viscosity of the fluid. Varying the angle θ to change the position at which the Karman vortex is initiated in the flow field F can cause the Karman excitation so as to maximize the energy conversion efficiency η. The varying of the angle θ changes the state of a laminar separation caused at a surface of the oscillator 12 in the flow field F, causing a change to the behavior of the Karman vortex. Consequently, varying the angle θ at every change of the flow velocity in the flow field F can optimally adjust the energy conversion efficiency η.

The sectional shape having the projection 13b at the angle θ as illustrated in FIG. 8 can be also applied to the oscillation regulator 20 illustrated in FIGS. 4A to 4D. The angle θ may also be varied with the flow velocity and the viscosity of the fluid for the oscillation regulator 20. The oscillation regulator 20 having such a sectional shape can adjust and maximize the energy conversion efficiency η varying the angle θ with a change in the flow velocity of the flow field F.

Figure 9A:
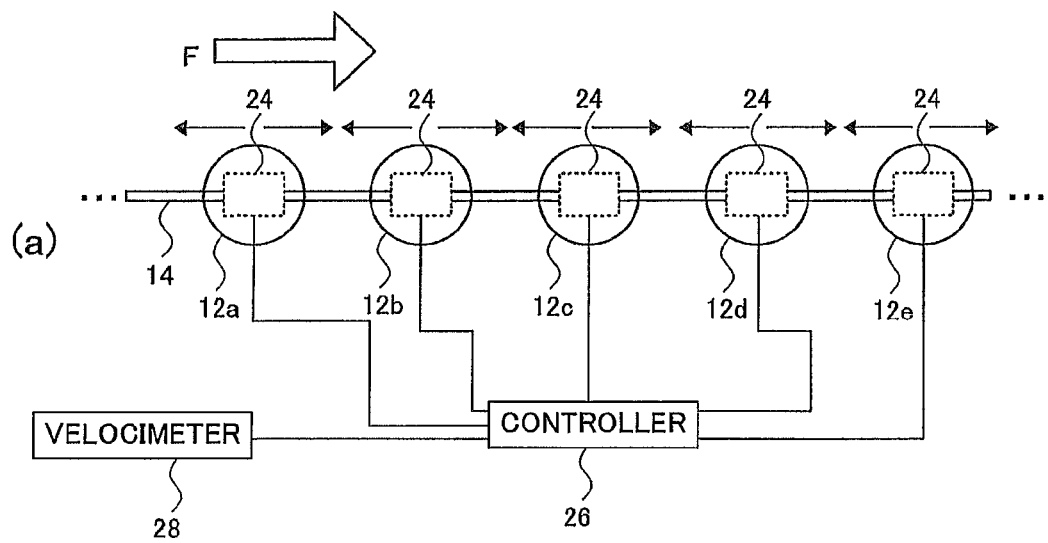
FIGS. 9A and 9B are schematic diagrams of other examples of the system arrangement according to the first embodiment.

Additionally, the array of the plurality of oscillators 12a to 12e illustrated in FIG. 3 may be arranged, as illustrated in FIG. 9A, such that the distances between the central axes of the oscillators 12a to 12e in an array direction (the flow direction of the fluid) is changed with the flow velocity of the fluid in the flow field F. Specifically, the oscillators 12a to 12e each includes a travel mechanism 24 that allows the oscillators 12a to 12e to travel along the support 14. The dynamo in this case may include a controller 26, which is formed with a computer for controlling the travel of the travel mechanism 24, and a velocimeter 28, which is for measuring the flow velocity of the fluid. The information of the flow velocity measured by the velocimeter 28 is sent to the controller 26. The controller 26 retains the record of an optimum distances between the axes of the oscillators 12a to 12e for every flow velocity. The optimum distances between the axes refer to distances between the axes that yields a maximum energy conversion efficiency η. The controller 26 obtains an optimum distances between the axes of the oscillators 12a to 12e based on the flow velocity measured by the velocimeter 28 and issues an instruction to drive the travel mechanism 24 so as to achieve the obtained distances between the axes. The condition under which the self-excited oscillations of the oscillators 12a to 12e are caused varies with the flow velocity of the fluid, and thus the oscillators 12a to 12e are allowed to travel to different positions to enable the adjustment of the distances between the axes of the oscillators 12a to 12e. In other words, the controller 26 causes at least one of the positions of the oscillators 12a to 12e to move so as to adjust the distances between the axes of the oscillators 12a to 12e. This can cause the self-excited oscillations so as to maximize the energy conversion efficiency η.

Figure 9B:
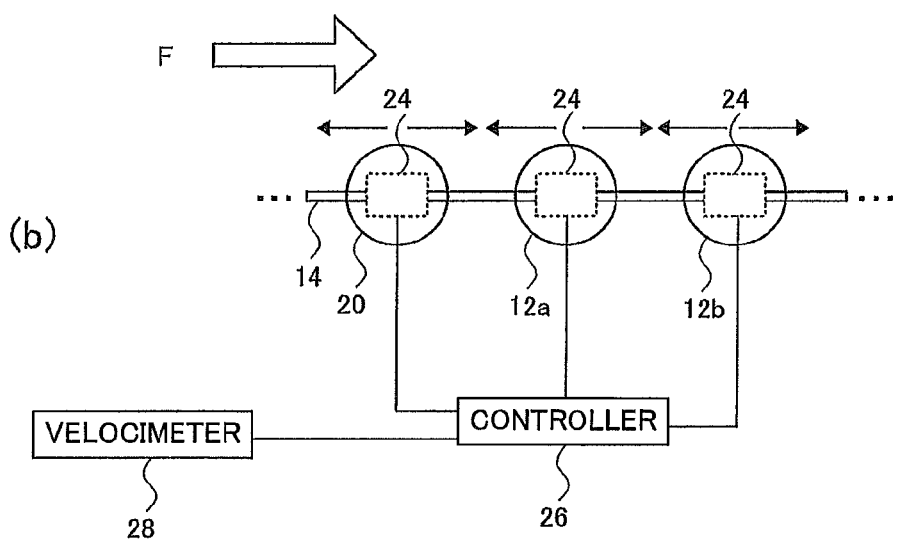

As illustrated in FIG. 9B, the oscillators 12a and 12b and the oscillation regulator 20 may include a transfer mechanism 24 that allows the oscillators 12a and 12b and the oscillation regulator 20 to travel in the flow direction so that the distances between the axes of the oscillation regulator 20 and the oscillators 12a and 12b can also be adjusted in the flow direction of the fluid in the various configurations illustrated in FIGS. 4A to 4D, in addition to the distances between the axes of the oscillators 12a and 12b and the like. For such configurations, the controller 26, which is formed with a computer for controlling the travel of the travel mechanisms 24, and the velocimeter 28, which is for measuring the flow velocity of the fluid, may also be included. In other words, the controller 26 causes at least one of the positions of the oscillation regulator 20 and the oscillators 12a and 12b to move so as to adjust the distances between the axes of the oscillation regulator 20 and the oscillators 12a and 12b.

Figure 10:
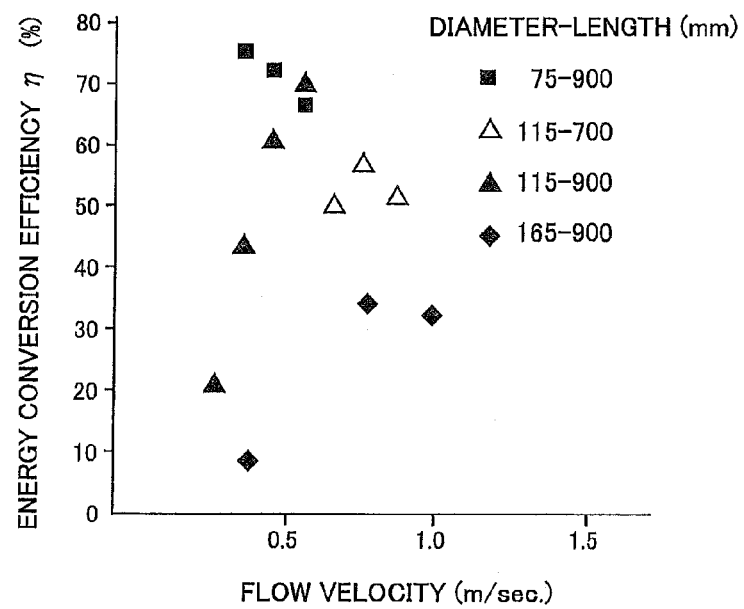
FIG. 10 is a graph of a result of the measurement of energy conversion efficiencies of the oscillator according to the first embodiment.
Figure 11:
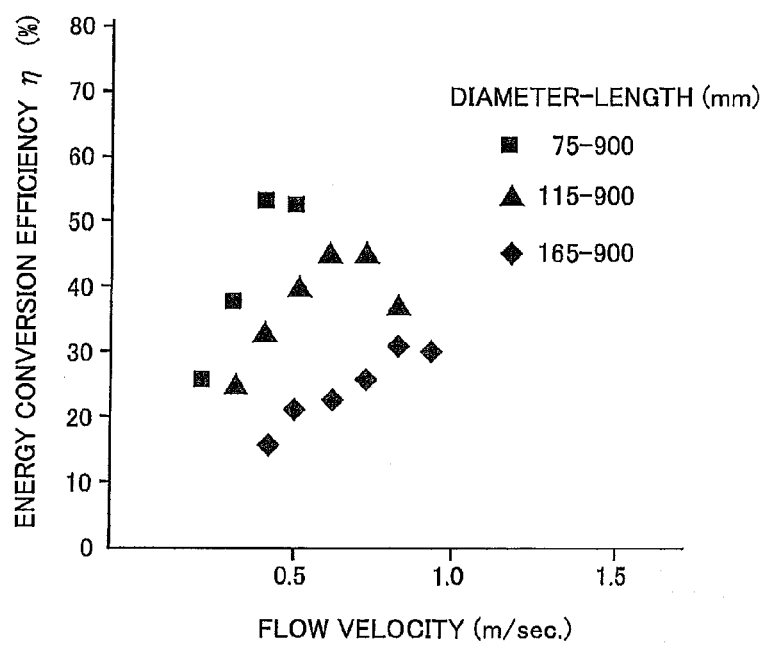
FIG. 11 is a diagram of a result of measurement of energy conversion efficiencies of a modification of the oscillator according to the first embodiment.

FIG. 10 is a graph of energy conversion efficiencies η of the oscillator 12 illustrated in FIG. 1, resulting from varying the flow velocity and the length and the diameter d of the oscillator 12. FIG. 11 is a graph of energy conversion efficiencies η of the oscillator 12a, obtained with the configuration illustrated in FIG. 4A but with the oscillator 12b excluded, i.e., with a configuration formed with the oscillation regulator 20 and the oscillator 12a, resulting from varying the flow velocity and the length of the oscillator 12a. The distances between the axes of the oscillation regulator 20 and the oscillator 12a used for this time are 90 mm for the diameter of 75 mm and the length of 900 mm, 135 mm for the diameter of 115 mm and the length of 900 mm, and 190 mm for the diameter of 165 mm and the length of 900 mm. The power exerted by the oscillator 12 or the oscillator 12a to a torque attenuator connected to the oscillator 12 or the oscillator 12a has been measured to obtain a maximum power, of the oscillator 12 or the oscillator 12a, for use in the calculation of the energy conversion efficiencies η, with the assumption of a dynamo. The oscillator 12 and the oscillator 12a have been both formed with vinyl chloride pipes.

Figure 12:
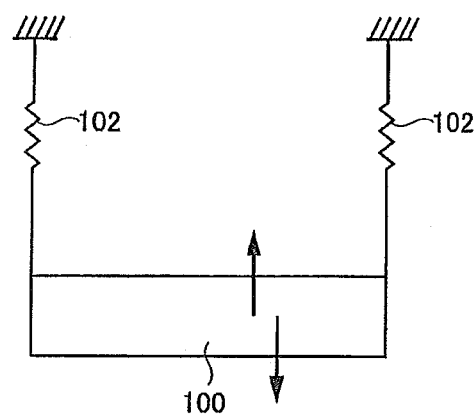
FIG. 12 is a schematic diagram of an example of a conventional oscillator.

The results illustrated in FIG. 10 indicate that the oscillator 12 illustrated in FIG. 1 achieves the energy conversion efficiency η of 76% at maximum, and thus the oscillation of the oscillator 12 can output 76% of the kinetic energy by the fluid flow. The use of the oscillator 12a, as illustrated in FIG. 11, achieves the energy conversion efficiency η of 55% at maximum. In other words, the oscillation of the oscillator 12a can output 55% of the kinetic energy by the fluid flow. As described above, it is understood that the oscillator 12 or the oscillator 12a according to the present embodiment and the modifications achieves the energy conversion efficiency η of more than 50%, and thus it is possible to output the energy effectively from the kinetic energy of the fluid through the oscillation of the oscillator. In particular, the energy conversion efficiency η of the oscillator 12 illustrated in FIG. 1 exceeds 70%, which is a high value. A configuration, as illustrated FIG. 12, that includes an oscillator 100 of a circular cylindrical shape, positioned in a horizontal direction in the flow field F and supported by elastic members 102, such as springs, at both ends of the oscillator 100, has achieved the energy conversion efficiency η of 37% at maximum with the Karman vortex excitation caused. This indicates that the energy conversion efficiencies η in the present embodiment and the modifications are higher than that in a conventional configuration. Therefore, the electric power generated by the oscillation of the oscillator can be obtained efficiently with a simple arrangement in the present embodiment and the modifications.

Second Embodiment

A dynamo according to a second embodiment is, as in the first embodiment, installed in a flow field of a liquid having a liquid surface. The dynamo includes a columnar oscillator and an electricity generator.

The oscillator is supported at its one end by an axis parallel to a flow direction of the fluid. In other words, the oscillator is in the liquid and pivotally supported at its upper end side. The oscillator makes oscillations about the axis in the flow field of the liquid due to self-excited oscillations. The electricity generator generates the electric energy corresponding to the oscillations of the oscillator.

With this arrangement, the dynamo according to the second embodiment eliminates the need for an elastic member which is used in a conventional dynamo for converting the oscillation energy to the electric energy. The dynamo according to the second embodiment thus can obtain the electric energy, generated through the oscillation of the oscillator caused by the flow of the fluid, with a simple arrangement. Additionally, the dynamo according to the second embodiment, which includes no elastic member, is superior in durability to a dynamo including an elastic member.

Figure 13:
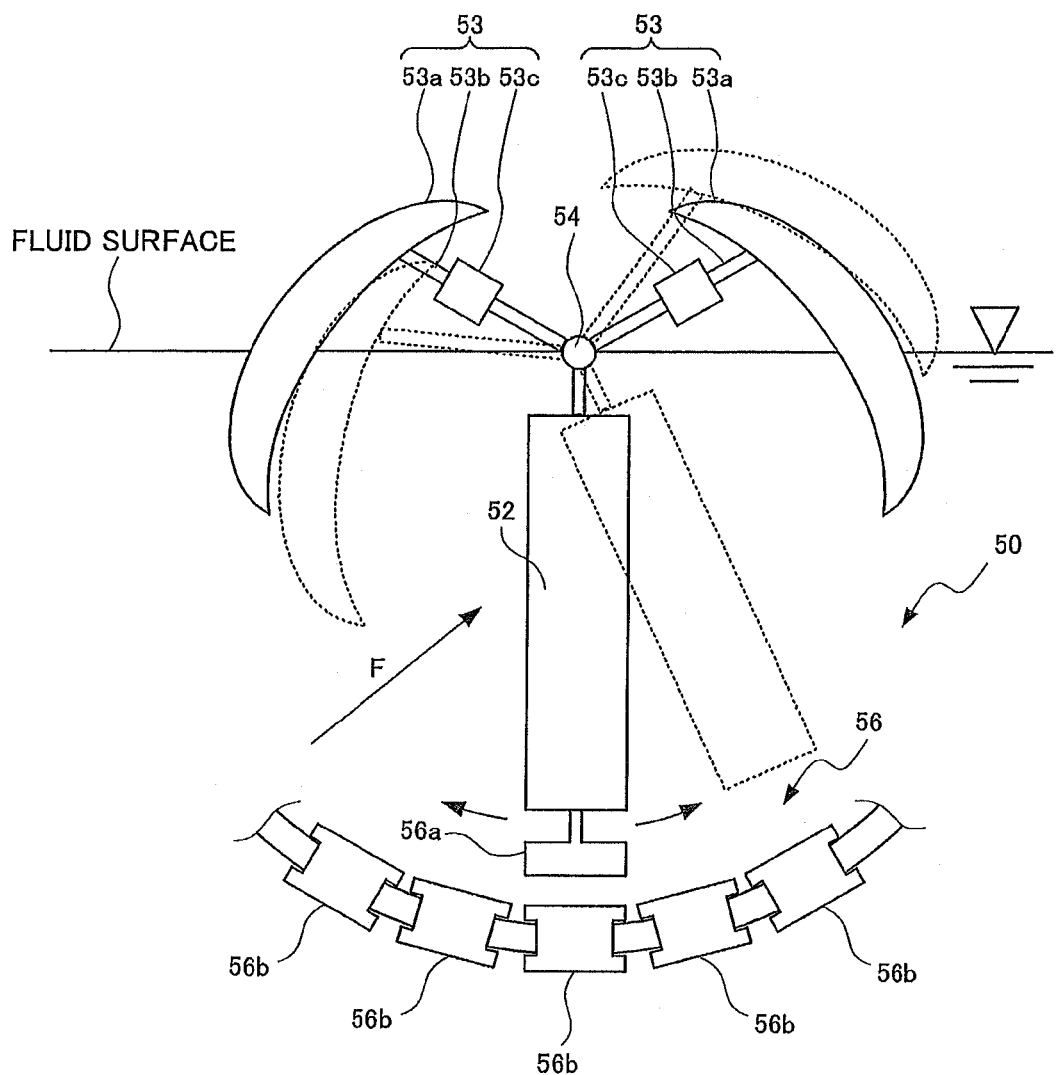
FIG. 13 is a schematic block diagram of a dynamo according to a second embodiment.

FIG. 13 is a block diagram of a dynamo 10 according to the second embodiment.

The dynamo 50 includes an oscillator 52, a support 54, a pair of floats 53, and an electricity generator 56 and is installed in a liquid having a flow field F or on a surface of the liquid. The oscillator 52 is shaped into a column extending in a direction orthogonal to the flow direction of the liquid (the direction marked with an arrow of the flow field F in FIG. 1). The specific gravity of the oscillator may be larger or smaller than that of the liquid. It is preferable, however, that the specific gravity of the oscillator is smaller than that of the liquid so that the oscillator oscillates in the flow field F with ease. The oscillator 52 is located in the flow field F of the liquid and thereby oscillates about the support 54 being parallel to the flow direction of the fluid and pivotally supporting a vertically upper end side of the oscillator 52 in the flow field F, as in the first embodiment. This oscillation is due to the Karman vortex excitation caused because of the location of the oscillator 52 in the flow field F. The floats 53 each includes a float body 53a and a pair of arms 53b. The arms 53b extend in two directions orthogonal to the axial direction of the axis of the support 54. Specifically, the pair of arms 53b each extends in the direction which is orthogonal to the axis of the support 54, and each extends toward opposite side from the axis in view of the liquid surface. In FIG. 13, when the oscillator 52 is oriented downward in the vertical direction, the arms 53b extend in symmetry directions so that the oscillator 52 and the arms 53b form a Y shape. The float body 53a is provided on an end of the arm 53b and has a crescent shape that extends along a circumference of a circle around the axis of the support 54 at the center. The specific gravity of the float body 53a is lighter than that of the liquid.

Thus, the arms 53b and the float bodies 53a are provided such that, during an oscillation of the oscillator 52 due to the self-excited oscillation, one float body 53a of the pair of float bodies 53a is submerged in the liquid more than the other float body 53a to generate a restoring force. In other words, the floats 53 each includes the float body 53a and arm 53b and functions as a restoring force generator. Specifically, the positions each connecting the arm 53b and the float body 53a, the lengths of the float bodies 53a, the extending directions of the arms 53b, and the lengths of the arms 53b are set so as to generate a preferable restoring force.

The oscillator 52 is preferably formed with, for example, vinyl chloride, fiber-reinforced plastic, or steel when the fluid is water. Although the oscillator 52 is a circular cylinder, the oscillator 52 may be another type of columnar body etc., such as a triangular prism, a rectangular column, and a polygonal column, instead of the circular cylinder. In order to generate the Karman vortex excitation for the circular cylindrical oscillator 12 positioned in the flow field F with the fluid (for example, water) at a flow velocity of 1 to 5 m/second, the oscillator 52 preferably has a diameter of from 100 to 3000 mm so that, for example, the Reynolds number is in a range from $10^5$ to $10^7$. The oscillator 52 preferably has a length of, for example, 50 to 2000 cm.

The support 54 extends in parallel with the flow direction of the fluid and pivotally supports a portion of the oscillator 52 at the vertically upper end side of the oscillator rotatably. The oscillator 52 is connected to the float bodies 53a. Consequently, the float bodies 53a at both sides of the oscillator 52 are different from each other in volume that is submerged in the liquid during the oscillation of the oscillator 52, imparting a difference in the buoyancy and thereby providing the restoring force to the oscillation. The oscillator 52, thus, forms an oscillatory system with this restoring force. Matching the frequency of the self-excited oscillation due to the Karman vortex with the frequency of the oscillatory system formed by the oscillator 52 and the restoring force can produce resonance to achieve large oscillations. Since the frequency of the oscillation of the oscillatory system varies with the length of the arm 53b from the axis of the support 54 to the float body 53a, an adjustment mechanism 53c capable of adjusting the length from the axis of the support 54 to the float body 53 is preferably provided on the arm 53b. For example, a measurement and control device, not illustrated, measures the frequency of the self-excited oscillation, due to the Karman vortex, of the oscillator 52, and the length of the arm 53b is adjusted variably by the adjustment mechanism 53c in response to the frequency. The frequency of the self-excited oscillation of the oscillator 52 varies, for example, with the flow velocity of the flow field F. The adjusting of the length of the arm 53b in response to the measured frequency is thus suitable for optimally outputting the electric energy from the flow field F.

The electricity generator 56 includes, for example, a magnetic field generator 56a such as a permanent magnet, and conductors 56b such as coils. The magnetic field generator 56a is attached to the vertically lower end of the oscillator 52 to move with the oscillator 52. The conductors 56b are spaced along the oscillation path of the oscillator 52 and arranged to face the magnetic field generator 56a, which moves with the oscillator 52, with a space therebetween. In the electricity generator 56, the oscillation of the oscillator 52 imparts a relative motion between the conductors 56b and the applied magnetic field of the magnetic field generator 56a, which, as a result, brings about a change in intensity of the magnetic field applied to the conductors 56b. The change in intensity of the magnetic field applied to the conductors 56b causes electromagnetic induction, resulting in an induced current flowing in the conductors 56b. The electric energy is thus generated.

This arrangement can convert the oscillation energy of the oscillator 52 to the electric energy directly and, thus, can yield improved efficiency of conversion from the oscillation energy to the electric energy in comparison with an arrangement with indirect conversion to the electric energy, as in the case in which a power generating motor connected to an oscillator 52 is rotated through the oscillation energy of the oscillator 52 to generate electricity.

Although the configuration illustrated in FIG. 13 includes the magnetic field generator 56a provided on the oscillator 52 and the conductors 56b provided in the liquid, the magnetic field generator 56a may be provided in the liquid and the conductors 56b may be provided on the oscillator 52.

Additionally, the oscillation regulator 20 used in the first embodiment (see FIG. 4A to FIG. 4D) may be positioned at the upstream side or the downstream side of the oscillator 52 in the second embodiment.

Figure 14:
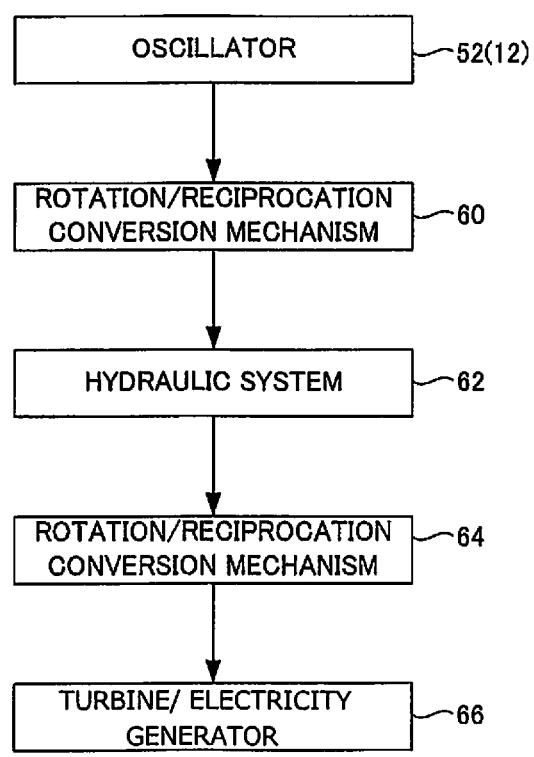
FIG. 14 is a diagram for describing still another example of the dynamos according to the first embodiment and the second embodiment.

Furthermore, although the second embodiment employs the configuration of the electricity generator 56 in which the magnetic field generator 56a and the conductors 56b are combined to directly obtain the electric energy from the oscillator 52, as in the first embodiment, the electricity generator 56 may employ other configurations. With reference to FIG. 14, the oscillation of the oscillator 52 rotating about the axis of the support 54 may be converted to a reciprocal motion through a rotation/reciprocation conversion mechanism 60, and this reciprocal motion may be transmitted to a distant position through a hydraulic system 62. The reciprocal motion may be further converted to a rotary motion through a reciprocation/rotation conversion mechanism 64, and this rotary motion may be, in a turbine/electricity generator 66, used to rotate a turbine to be converted to the electric energy through an electricity generator. Such a configuration for generating electricity may be applied to the dynamo 10 according to the first embodiment. The rotation/reciprocation conversion mechanism 60 and the reciprocation/rotation conversion mechanism 64 may employ a cam shaft mechanism or the like.

As described above, the dynamo according to the second embodiment eliminates the need for an elastic member for oscillating the oscillator 52 and thus can reduce the manufacturing costs. Additionally, the dynamo according to the second embodiment, which includes no elastic member, is superior in durability to a dynamo including an elastic member.

While the dynamo according to the present invention has been described in detail as described above, the present invention is not limited to the embodiments or the modifications described above, and various improvements and modifications within the spirit of the present invention are of course possible.

REFERENCE SIGNS LIST 10, 50 Dynamo
12, 12a, 12b, 12c, 12d, 12e, 52 Oscillator
13a Straight line
13b Projection
14, 54 Support
16, 56 Electricity generator
16a, 56a Magnetic field generator
16b, 56b Conductor
18 Separated flow
20 Oscillation regulator
22 Adjuster
24 Travel mechanism
26 Controller
28 Velocimeter
53 Float
53a Float body
53b Arm
53c Adjustment mechanism 53d Restoring force generator
60 Rotation/reciprocation conversion mechanism
62 Hydraulic system
64 Reciprocation/rotation conversion mechanism
66 Turbine/electricity generator

The invention claimed is:

1. A dynamo installable in a flow field of a fluid, the dynamo comprising:
   a support axis being parallel to the flow direction of the fluid;
   a first columnar oscillator configured to oscillate about the support axis due to a self-excited oscillation, the support axis supporting at one end of the columnar oscillator in the flow field of the fluid, the first columnar oscillator including a first travel mechanism that allows the first columnar oscillator to travel along the support axis;
   a second columnar oscillator configured to oscillate about the support axis due to a self-excited oscillation, the support axis supporting at one end of the second columnar oscillator in the flow field of the fluid, the second columnar oscillator including a second travel mechanism that allows the second columnar oscillator to travel along the support axis;
   an electricity generator configured to generate electric energy corresponding to an oscillation of the first columnar oscillator and the second columnar oscillator;
   a velocimeter configured to measure a flow velocity of the fluid; and
   a controller configured to cause at least one of a position of the first columnar oscillator and a position of the second columnar oscillator to move so as to adjust a horizontal distance between the first columnar oscillator and the second columnar oscillator in response to the flow velocity of the fluid.

2. The dynamo according to claim 1, wherein each of the first columnar oscillator and the second columnar oscillator has a specific gravity smaller than that of the fluid, and each of the first columnar oscillator and the second columnar oscillator is supported at the end at a vertically lower end side thereof by the support axis.

3. A dynamo installable in a flow field of a fluid, the dynamo comprising:
   a support axis being parallel to the flow direction of the fluid;
   a columnar oscillator configured to oscillate about the support axis due to a self-excited oscillation, the support axis supporting at one end of the columnar oscillator in the flow field of the fluid, the columnar oscillator including a travel mechanism that allows the columnar oscillator to travel along the support axis;
   an oscillation regulator configured to control the oscillation of the columnar oscillator, the oscillation regulator being apart from the columnar oscillator on at least one of an upstream side and a downstream side of the columnar oscillator in the flow field and including a second travel mechanism that allows the oscillation regulator to travel along the support axis;
   an electricity generator configured to generate electric energy corresponding to an oscillation of the columnar oscillator;
   a velocimeter configured to measure a flow velocity of the fluid; and
   a controller configured to cause at least one of a position of the columnar oscillator and a position of the oscillation regulator to move so as to adjust a horizontal distance between the columnar oscillator and the oscillation regulator in response to the flow velocity of the fluid.

4. The dynamo according to claim 3, wherein the columnar oscillator comprises:
   a rod extending in a longitudinal direction of the columnar oscillator; and
   an adjuster configured to slide on the rod in the longitudinal direction to adjust a natural frequency of the columnar oscillator.

5. The dynamo according to claim 1, wherein the electricity generator comprises a plurality of conductors provided along a path of the columnar oscillator, and a magnetic field generator attached to the columnar oscillator and configured to apply a magnetic field to the conductors facing the magnetic field generator, the magnetic field varying around the conductors due to the oscillation of the columnar oscillator to generate the electric energy.

6. The dynamo according to claim 1, wherein the electricity generator comprises a conductor attached to the columnar oscillator, and a plurality of magnetic field generators provided along a path of the columnar oscillator and configured to apply a magnetic field to the conductor facing the magnetic field generators, the magnetic field varying around the conductor due to the oscillation of the columnar oscillator to generate the electric energy.

7. The dynamo installable in a flow field of a fluid, the dynamo comprising:
   a support axis being parallel to the flow direction of the fluid and disposed on a liquid surface of the fluid;
   a columnar oscillator configured to oscillate about the support axis due to a self-excited oscillation, the support axis supporting at one end of the columnar oscillator in the flow field of the fluid, such that the columnar oscillator is supported at a vertically upper end thereof by the support axis;
   an electricity generator configured to generate electric energy corresponding to an oscillation of the columnar oscillator;
   a pair of arms each extending obliquely upward from the vertically upper end of the columnar oscillator above the liquid surface and configured to oscillate with the columnar oscillator, each arm extending in a direction which is orthogonal to the support axis and extending toward an opposite side in view of a liquid surface of the fluid; and
   a pair of float bodies each provided at an end of the each arm, each of the float bodies having an arc shape around the support axis.

8. The dynamo according to claim 7, further comprising an adjustment mechanism provided for adjusting each length of the arm.

9. The dynamo according to claim 3, wherein the columnar oscillator has a specific gravity smaller than that of the fluid, and the columnar oscillator is supported at the end at a vertically lower end side thereof by the support axis.

* * * * *